United States Patent
Shah

(10) Patent No.: US 7,647,070 B2
(45) Date of Patent: *Jan. 12, 2010

(54) METHOD AND APPARATUS FOR DISABLING THE RF FUNCTIONALITY OF A MULTI-FUNCTION WIRELESS COMMUNICATION DEVICE WHILE MAINTAINING ACCESS TO LOCAL FUNCTIONALITY

(76) Inventor: Nitin J. Shah, 7791 Orion Pl., Cupertino, CA (US) 95014

( * ) Notice: Subject to any disclaimer, the term of this patent is extended or adjusted under 35 U.S.C. 154(b) by 107 days.

This patent is subject to a terminal disclaimer.

(21) Appl. No.: 11/496,021

(22) Filed: Jul. 28, 2006

(65) Prior Publication Data

US 2007/0060212 A1    Mar. 15, 2007

Related U.S. Application Data

(63) Continuation of application No. 09/745,493, filed on Dec. 22, 2000.

(51) Int. Cl.
*H04M 1/00* (2006.01)

(52) U.S. Cl. ............... 455/556.1; 455/556.2; 455/557; 455/574; 455/343.5; 455/418; 455/419

(58) Field of Classification Search ............... 455/556.1, 455/556.2, 557, 574, 343.1, 343.5, 418, 419
See application file for complete search history.

(56) References Cited

U.S. PATENT DOCUMENTS

| | | | |
|---|---|---|---|
| 4,972,457 A | 11/1990 | O'Sullivan | |
| 5,337,346 A | 8/1994 | Uchikura | |
| 5,420,599 A | 5/1995 | Erkocevic | |
| 5,519,763 A | 5/1996 | Namekawa et al. | |
| 5,584,054 A | 12/1996 | Tyneski | |
| 5,752,199 A | 5/1998 | Scott | |
| 5,894,595 A | 4/1999 | Foladare et al. | |
| 5,956,651 A | 9/1999 | Wilkie et al. | |
| 5,983,073 A | 11/1999 | Ditzik | |
| 6,038,294 A | 3/2000 | Tran et al. | |
| 6,061,553 A * | 5/2000 | Matsuoka et al. | 455/273 |
| 6,085,096 A | 7/2000 | Nakamura | |
| 6,233,464 B1 * | 5/2001 | Chmaytelli | 455/556.2 |
| 6,343,213 B1 * | 1/2002 | Steer et al. | 455/411 |
| 6,397,082 B1 * | 5/2002 | Searle | 455/562.1 |
| 6,434,371 B1 | 8/2002 | Claxton | |
| 6,512,917 B1 * | 1/2003 | Hiramatsu | 455/69 |
| 6,556,845 B1 * | 4/2003 | Ide et al. | 455/562.1 |
| 6,625,478 B1 | 9/2003 | Nonogaki | |
| 6,928,300 B1 * | 8/2005 | Skinner et al. | 455/556.2 |
| 2002/0123372 A1 * | 9/2002 | Kobayakawa | 455/562 |
| 2003/0129996 A1 * | 7/2003 | Maloney et al. | 455/456 |

FOREIGN PATENT DOCUMENTS

JP    11017829    1/1999

* cited by examiner

*Primary Examiner*—Minh D Dao
(74) *Attorney, Agent, or Firm*—Stolowitz Ford Cowger LLP

(57) ABSTRACT

A method and apparatus for disabling the communication functionality (i.e., disabling the transmission and/or reception of RF signals) of an integrated device, while still providing access to the local functionality of such device. A control and select function, such as a switch that is implemented by hardware or software or a combination thereof, is provided in an integrated device to allow the end user of the device to access the local data processing functionality of the device, even while the wireless communication functionality of such device is disabled.

39 Claims, 1 Drawing Sheet

METHOD AND APPARATUS FOR DISABLING THE RF FUNCTIONALITY OF A MULTI-FUNCTION WIRELESS COMMUNICATION DEVICE WHILE MAINTAINING ACCESS TO LOCAL FUNCTIONALITY

This is a continuation of U.S. patent application Ser. No. 09/745,493, filed on Dec. 22, 2000.

FIELD OF THE INVENTION

The present invention relates to the field of wireless communications systems, and in particular, to a method and system for disabling the radio functionality of a multifunction communication device, while continuing to provide access to the local, non-radio functionality (e.g., information access and/or manipulation functionality) of such device.

BACKGROUND OF THE INVENTION

The utilization and functionality of end user portable devices is increasingly growing more diverse than the traditional automobile-mounted or even portable cellular telephone, which was exclusively a communications tool, and thus had virtually no practical functionality without the radio link in operation. In contrast to such early cellular telephones, which provided little more than wireless/RF communications functionality, modern systems increasingly integrate communication functionality with other types of non-communication or "local" functionality in one integrated device. On the other hand, portable appliances, such as laptop computers, personal digital assistants (PDAs), and even gaming devices, that traditionally provided only "local functionality" have evolved into multi-function devices that provide hard-wired or even wireless communication functionality, as well as "local computing functionality." In sum, traditional portable data storage/manipulation devices and traditional wireless communication devices have evolved and merged into multi-function integrated portable devices that provide both communication functionality and local functionality.

As used herein, an "integrated" or "multifunction" communication device or simply "integrated device" includes devices that integrate both wireless communication functionality as well as non-communication functionality (e.g., a cellular device that incorporates data processing/computing functionality) into one device, as well as two separate devices that are interfaced to provide both communications and local functionality (e.g., a laptop computer or PDA or other portable device that is interfaced with another device, such as a wireless modem or other wireless communication module or PC card, such as a PCMCIA card, to provide both information access and/or manipulation functionality as well as communication functionality). The term "local functionality" is used herein to denote non-communication functionality, such as information access or manipulation (e.g., gaming, address storage/retrieval, execution of one or more applications such as word processing, spreadsheet, etc.). In other words, "local functionality" is used herein to denote various functionality of an integrated device that may be enjoyed by an end user while the device is not transmitting and/or receiving RF signals.

Because modern integrated devices, such as multi-function cellular phones or portable data processing devices that also provide wireless communication functionality, are not limited exclusively to communications functionality, but may include local functionality, such devices may provide significant utility even when not "connected" to (i.e., receiving signals from, or transmitting signals to) an external entity through a wireless communication channel.

Unfortunately, modern integrated devices have suffered from a number of limitations. For instance, when an integrated cellular telephone is in an "idle" state (i.e., the power is on, and the integrated device may receive calls, transmit and/or receive control signals sent by or to nearby base stations, respectively, or otherwise be enabled to transmit/receive RF signals), a received call may cause a disruption to the end user in certain situations, such as when the end user is in a meeting, in a classroom, etc. Even if a traditional voice or data "call" is not received, other information exchange, such as periodic updates, including voicemail notifications, control/broadcast information exchange with an external entity (e.g., a base station), etc., may cause disruption or other undesirable effects in certain situations. In order to prevent such disruption, the end user may forgo the use of the integrated device altogether, thereby not being able to access the local functionality of the device. Moreover, because power conservation is a significant issue concerning mobile/portable integrated devices, which generally use rechargeable batteries that provide limited use time, the idle state of the integrated device may unnecessarily consume power, especially when the end user of such a device intends to access exclusively the local functionality of the device. Finally, the use of such integrated devices is typically altogether precluded in certain restricted areas (e.g. aboard aircraft), where the electromagnetic radiation caused by the RF portions of such devices, which may periodically transmit control or other types of signals and/or receive the same, may interfere with navigational or safety equipment.

As such, even though modern integrated devices potentially provide both communications functionality and local functionality, such local functionality in many circumstances may not be available because of the undesirable effects caused by the communications functionality, such as disruption, unnecessary consumption of power, interference with safety or navigational equipment in restricted areas, etc.

Thus, what is needed is a method and apparatus for increasing access to the local functionality of integrated devices.

SUMMARY OF THE INVENTION

A method and apparatus is provided for disabling the communication functionality (i.e., disabling ability of the device to transmit and/or receive RF signals) of an integrated device, while still providing access to the local functionality of such device. A control and select function, such as a switch that is implemented by hardware or software or a combination thereof, is provided in an integrated device to allow the end user of the device to access the local data processing functionality of the device, even while the wireless communication functionality of such device is disabled.

DETAILED DESCRIPTION

Figure 1:
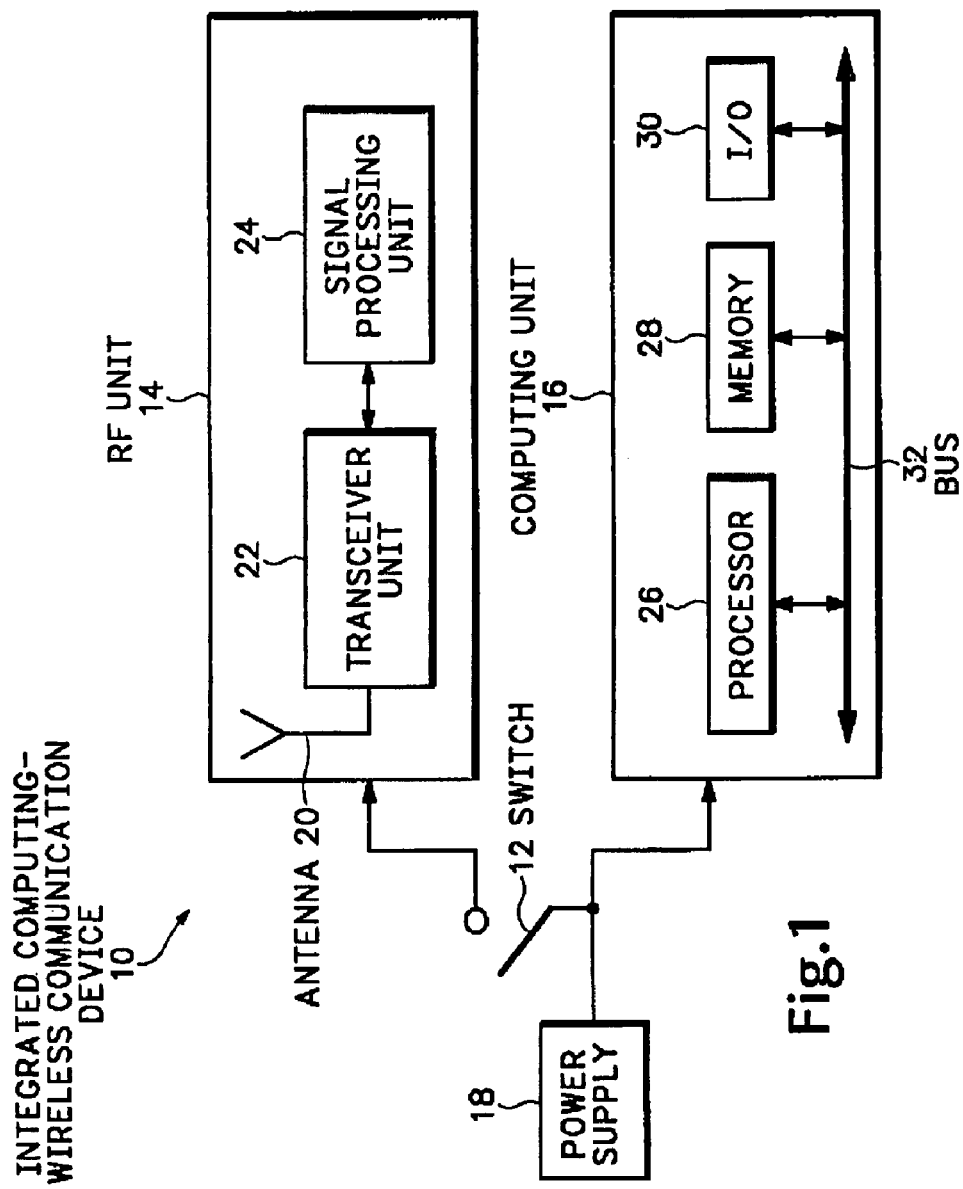
FIG. 1 is a block diagram of an integrated computing-wireless communication device, in accordance with one embodiment of the invention.

The present invention provides method and apparatus is provided for disabling the communication functionality of an integrated device (i.e., disabling the ability of the device to transmit and/or receive RF signals), while still providing access to the local functionality of such device. In one embodiment, a control and select function, such as a switch or other toggle or selecting mechanism, which mechanism may be implemented by hardware or software or a combination thereof, is provided in an integrated computing-wireless device, to allow an end user of the device to disable transmission and/or reception of signals associated with the radio communication portion of the device, while being able to access the local functionality of the device. Such local functionality may include, but is not limited to, access to one or more data storage areas for entry or retrieval of data (e.g., addresses, phone numbers, or other information), utilization of software applications (e.g., word processing, scheduling, spreadsheet, calculator, etc.), games, multimedia (e.g., playing video and/or audio, etc.), and/or other local data processing features and functions that can be performed even during such time that the device does not receive signals from, or transmit signals to, an external entity. The external entity may include a cellular base station or other wireless communication device that can enable transfer of voice and/or data between the integrated device and the external device and/or a network, such as the Internet, public switched telephone network (PSTN), etc.

In the following description, numerous specific details are set forth to provide a thorough understanding of the invention and its various embodiments. However, it should be appreciated that the invention may be practiced without these specific details. In other instances, well-known circuits, structures, and techniques have not been shown in detail in order to avoid obscuring the invention. It should further be noted that the various elements of the invention may be implemented in hardware (e.g., circuitry), software (e.g., machine-executable instructions), or a combination thereof.

FIG. 1 is a block diagram of an integrated communication device, in accordance with one embodiment of the invention. In one embodiment, the integrated device 10 shown in FIG. 1 represents a multi-function cellular telephone that provides wireless voice and/or data communication functionality, as well as local functionality, such as information access and/or manipulation. In an alternative embodiment, the device 10 represents a portable data processing device (e.g., a personal digital assistant (PDA), a laptop computer, a gaming device, or other portable device that enables information access and/or manipulation or other local functionality) that may also provide wireless communication functionality. In such an embodiment, the portable computing device may include integrated or modular radio/wireless communication functionality. In the latter case, the device 10 may include, for example, an installable-removable PCMCIA card/modem or other installable module that provides voice and/or data wireless and/or wired modem functionality. In yet other embodiments, the integrated device 10 may represent one or more types of devices, including "portable multifunction appliance (s)," that provide both local functionality and wireless communication functionality.

As shown in FIG. 1, the integrated device 10 includes a power supply 18 to provide power to a computing unit 16 exclusively, or selectively, as provided by a switch 12 coupled to the power supply 18 and the computing unit 16, to provide power both to the computing unit 16 as well as a radio communication or RF unit 14. The power supply, in one embodiment, includes a direct current (DC) output rechargeable battery. In alternative embodiments, the power supply may instead, or in addition, include disposable battery power, AC outlet power, etc.

The RF unit 14 includes hardware, software, or combination thereof to enable wireless communication between the device 10 and an external entity, which may be a cellular base station or other transceiving device coupled to a voice network (e.g., the public switched telephone system (PSTN) or other voice network) and/or a data network (e.g., a WAN, such as the Internet, an intranet/LAN) or a combination voice/data network, for enabling the integrated device 10 to send and/or receive voice and/or data. To aid in the understanding of the invention, the RF unit 14 is shown to include an antenna 10, a transceiver unit 22, and a signal processing unit 24. It should be appreciated, however, that the RF unit 14 may generally include various other circuitry and/or software modules, such as one or more modulators, demodulators, analog-to-digital circuits (ADCs), digital-to-analog circuits (DACs), filters, etc. Also, the tranceiving unit 22, for example, may represent one or combination of a receiver, a transmitter, a receive (Rx)/transmit(Tx) switch, etc. The transmitter portion of the tranceiving unit 22 may include a local oscillator, for example, and in general, the tranceiving unit 22 may include various known RF components and/or software modules to allow wireless reception and transmission of information embodied in an electromagnetic radiation.

The computing unit 16 provides the local functionality of the device 10. The computing unit 16 is shown to include a processor 26, a memory 28, and an input/output (I/O) unit 30, all coupled to a bus 32. The processor 26 includes at least one processor to provide data processing functionality to the device 10. Such functionality may be exclusively local functionality, or may involve communication between the device 10 and an external device (e.g., Web browsing, sending/receiving email, files, multimedia, voice, etc.). Thus, the computing unit 16 may function exclusive of the RF unit 14, or in conjunction therewith. The external device may be another integrated device, a base station that employs an adaptive antenna array (or "smart antenna system), a conventional antenna system base station, etc. In turn, such external device may be coupled to a voice and/or data network (e.g., the PSTN, Internet, an intranet, etc.) to facilitate the exchange of voice and/or date between the integrated device 10 and the network.

The memory 28 represents one or more storage devices/media for storing information, including data and/or machine-executable instructions. As such, the memory 28 may include one or a combination of random access memory (RAM), read-only memory (ROM), flash memory, hard disk, floppy disk optical storage, such as CDROM, DVD, etc.

The I/O unit represents one or more user input and output interfaces and devices, and in one embodiment, includes a user-viewable screen, such as a liquid crystal display (LCD), as well as other I/O components, such as an alpha-numeric keypad and/or a touch screen, a joystick, a pointing device, a speaker, a microphone, etc.

In one embodiment of the invention, the switch 12 is coupled to the power supply 18 and the computing unit 16, and may be toggled to couple the power supply 18 to the RF unit 14 to selectively deliver or disable the deliver of power from the power supply 18 to the RF unit 14. In one embodiment of the invention, the switch 12 provides two modes of "on-power operation" for the integrated device 10. A first mode of operation is provided in which both the radio communication unit 14 is enabled (i.e., the RF unit 14 may receive signals from and/or transmit signals to an external entity) and the computing unit 16 is enabled to provide local functionality. In the first mode of operation, the integrated device 10 may provide communication functionality and/or radio functionality. For example, the integrated device 10, in the first mode, may provide network functionality, such as Web browsing, sending/receiving email, streaming audio/video, voice-over-IP, video conferencing, or other functions that involve wireless voice and/or data communication between the device 10 and an external device. In one embodiment, the device 10 may, in addition to providing wireless communication functionality, also provide wired communication functionality, for example, by providing a hard-wired Ethernet or public switched telephone network (PSTN) interface.

In addition, and in accordance with one embodiment of the invention, the switch 12 provides a second mode of operation in which the radio communication unit 14 is disabled, such that the radio communication unit 14 does not receive power from the power supply 18, and thus, the RF unit 14 may not receive or transmit signals. In the second or "radio mute" mode of operation, the computing unit 16 may still receive power, and thus provide access to the local functionality of the integrated device 10. This second mode may provide increased accessibility to local functionality relative to prior art integrated devices.

It should be appreciated that the switch 12 may be implemented in hardware or software or a combination thereof. For example, in one embodiment, a user-viewable screen of the device 10 may include a "soft-key" that may be selected by a user to disable the radio communication unit 14. For example, a selectable icon may appear on the screen of the device 10, which icon, when selected, disables the RF unit 14. In one embodiment, the RF unit 14 is disabled by switching off the power supply to the transmitter and receiver portions of the radio communication unit 14. In addition to or in lieu of the "soft-key," mechanism, one embodiment of the invention includes a depressable mechanical or touch-sensitive button or display icon that a user may toggle to disable the radio communication 14 (e.g., by terminating or switching off power delivery to the radio communication unit 14).

In yet another embodiment, the switch 12 may be implemented, or controllable, at least in part by an external device. In this embodiment, an external device, such as a base station or other device that is coupled to a voice and/or data network may trigger the device 10 to operate in the first or second mode. For example, the end user of the device 10 may program a system coupled to the network to cause the device 10 to operate in the first or second mode at a predetermined time (e.g., when the end user expects to board an aircraft, or go to a meeting, or any other time defined by the end user or other programmer). Furthermore, in one embodiment, the switch is implemented at least in part in a certain areas of a network, such as in a geographic area that includes at least a portion of a restricted area, such as an airport. In this embodiment, a broadcast signal is transmitted in such areas of the network to one or integrated devices, such as the device 10, to cause each such device to operate in the second (or first) mode. Therefore, it should be appreciated that the switch 12 may be implemented in a number of ways that may include one or combination or hardware and software, and furthermore, that the switch may be implemented or controllable at least in part on one or more devices external to the integrated device 10.

Furthermore, it should be appreciated that while one embodiment is shown that includes a single power supply, alternative embodiments may include separate power supplies for each of the RF unit 14 and the computing unit 16, along with a switching mechanism to disable the former power supply. In alternative embodiments, the RF unit 14 may be disabled by disabling just one (or possibly more) portions of the RF unit to disable RF signal transmission or reception by the device 10 that may be disruptive or which may cause interference in restricted areas, such as aircraft. For instance, in one alternative embodiment, the local oscillator of the RF unit may be disabled by software or a switch implemented by hardware. In another embodiment, the antenna 20 may be decoupled from the transceiver unit 22 by a switch. In yet another embodiment, the communication functionality may be disabled by increasing the electromagnetic shielding of the device 10 (e.g., by having an antenna that may be retracted into a shielded area, such as provided by an electromagnetic coil.), such that the wireless communication functionality of the device is effectively disabled. Still, the embodiments described may be modified by those having skill in the art to provide a selective mechanism for disabling the wireless communication functionality of an integrated device, while maintaining access to local functionality.

In one embodiment of the invention, the I/O unit 30 also includes an indicator to indicate whether the device 10 is operating in the second mode (and/or first mode). For example, in one embodiment, an LED and/or icon on the display of the device 10 may provide such indication. In addition or in lieu of a visual indication, the device 10 may also include an audible indicator to signal whether the device 10 is operating in the first or second mode of operation.

In one embodiment, when the second mode of operation is selected, the device 10 transmits a notification to an external device just prior to operating in the second mode (i.e., prior to disabling the radio communication functionality) that the device 10 is entering the "radio mute" mode. As such, the external device may perform certain functionality in accordance with such notification (e.g., allocate additional bandwidth to other devices, track and/or store incoming data or voice requests intended for the device 10, such as voicemails, incoming data or voice calls, etc.).

It should be appreciated that in alternative embodiments, one or more circuits or devices may be shared between the RF unit 14 and the computing unit 16. For example, a processor may provide signal processing functionality to the RF unit 14, while also providing local functionality (e.g., execution of applications, storage/retrieving of data, etc.) associated with the computing unit 16. For instance, the processor 26 may include one or more general-purpose processors to provide signal processing and data processing functionality to the RF unit 14 and the computing unit 16, respectively. As such, the switch 12 may merely disable (at least a portion of) the transceiver unit 22 and/or the antenna 20, such that the device 10 may still provide local functionality while communication functionality is disabled (i.e., RF signals are not being transmitted and/or received by the device 10).

Although the invention has been described with reference to several embodiments that provide increased access to the local functionality of integrated computing-wireless devices, it will be appreciated that various alterations and modifications may be possible without departing from the spirit and scope of the invention, which is best understood by the claims that follow.

What is claimed is:

1. A system comprising;
   a communication device adapted to transmit and receive information over a radio frequency communication link; wherein said communication device comprises:
   a first power supply;
   a computing unit, coupled to the first power supply;
   a second power supply;
   a radio communication unit coupled to the second power supply; and
   a switch adapted to selectively couple the radio communication unit to the second power supply, to provide first and second modes of operation, wherein the first mode of operation enables the computing unit and the radio communication unit, and the second mode of operation disables the radio communication unit and enables the computing unit.

2. The system of claim 1, wherein the communication device is configured to communicate with one or more base stations that provide cellular communication between mobile devices and a public switched telephone network (PSTN).

3. The system of claim 1, wherein the computing unit further comprises:
a data storage area to store information; and
a processor, coupled to the data storage area, to retrieve the information.

4. The system of claim 3, wherein the information includes random access information.

5. The system of claim 1, wherein the communication device is configured to communicate with an adaptive array base station.

6. A method comprising:
transmitting voice communications with a portable communication device over a radio frequency communication link;
enabling a first mode of operation of said portable communication device in which both wireless communication functionality and local functionality of the communication device are enabled;
enabling a second mode of operation of said portable communication device in which the communication functionality is disabled and the local functionality is enabled;
transmitting a wireless notification signal from the portable communication device to an external device prior to enabling the second mode of operation, the notification signal notifying the external device that the portable communication device is going into the second mode of operation; and
switching from the first mode of operation to the second mode of operation of said portable communication device after transmitting the notification signal.

7. The method of claim 6, and further comprising:
using a first power supply to power local circuitry that provides the local functionality in the portable communication device;
using a second power supply to power communication circuitry that provides the wireless communication functionality in the portable communication device;
enabling the first mode of operation by powering the portable communication device with both the first and second power supply; and
enabling the second mode of operation by selectively disconnecting the second power supply.

8. The method of claim 6, wherein transmitting the notification signal causes the external device to allocate additional bandwidth to other communication devices, or track and/or store incoming data or voice requests intended for the portable communication device.

9. The method of claim 6, wherein said switching between the first and second modes of operation comprises disabling at least a portion of a radio communication functionality in the second mode of operation.

10. The method of claim 6, wherein said transmitting of the notification message comprises transmitting said notification message over one or more base stations to a public switched telephone network (PSTN).

11. A system comprising:
a communication device adapted to transmit and receive information over a radio frequency communication link, said communication device providing wireless communication and local functionality wherein said communication device comprises:
a first power supply means for enabling local functionality;
a second power supply means for enabling communication functionality; and
a selection means triggered in response to a signal from at least one of said one or more base stations for selecting between a first mode of operation, wherein both the local functionality and the communication functionality are enabled, and a second mode of operation, wherein the local functionality is provided and the second power supply means are disconnected to disable the communication functionality.

12. The system of claim 11, wherein the selection means comprises means for switching between the first and second modes of operation.

13. The system of claim 12, wherein the switching means is coupled to a power supply means, said switching means being adapted to disable the supply of power from the second power supply means to at least a portion of the communication device.

14. The system of claim 11, wherein said communication device further comprises an indication means for indicating whether communication device is operating in the first or second mode of operation.

15. A method comprising:
transmitting voice communications with a portable communication device over a radio frequency communication link;
using a first power supply to power computing circuitry in the portable communication device that provides user-operated computing functionality;
using a second power supply to power radio communication circuitry in the portable communication device for transmitting and receiving signals;
providing a subscriber with access to the user-operated computing functionality of said portable communication device and access to the transmitting and receiving of said signals through said radio frequency communication link; and
subsequently disconnecting the second power supply from at least a portion of the radio communication circuitry disabling said access to transmitting said signals while maintaining said access to the user-operated computing functionality and the access to receiving said signals.

16. The method of claim 15, wherein said disabling the access to transmitting said signals comprises disabling at least a portion of a radio frequency (RF) unit of said portable communication device.

17. The method of claim 16, wherein disabling said at least a portion of the RF unit comprises disabling the portion of the RF unit with a switch.

18. The method of claim 16, wherein disabling said at least a portion of the RF unit comprises disabling a local oscillator of the RF unit.

19. The method of claim 18, wherein said disabling the local oscillator of the RF unit comprises sending a software command to a local oscillator control circuit to cause the local oscillator to cease operation.

20. The method of claim 18, wherein said disabling the local oscillator of the RF unit comprises triggering a hardware selection mechanism to cause the local oscillator to cease operation.

21. The method of claim 15, wherein said disabling the access to said transmitting signals comprises disabling an operation of an antenna.

22. The method of claim 21, wherein disabling the operation of the antenna further comprises disconnecting the antenna from a power supply.

23. The method of claim 21, wherein said disabling the operation of the antenna further comprises increasing electromagnetic shielding of the antenna.

24. The method of claim 23, wherein increasing the electromagnetic shielding of the antenna comprises surrounding the antenna with a metal coil.

25. The method of claim 15, wherein said disabling said access to said transmitting signals comprises disabling the access to said transmitting in response to selection of a soft key on the communication device.

26. The method of claim 15, wherein said disabling said access to said transmitting signals comprises disabling said access to said transmitting said signals in response to a toggling of a mechanical switch on the device.

27. The method of claim 15, wherein said disabling said access to said transmitting said signals further comprises disabling said access to said transmitting in response to pressure on a button of said communication device.

28. The method of claim 15, wherein said disabling said access to said transmitting said signals comprises disabling said access to said transmitting in response to receiving a disable command from an external entity.

29. A system comprising:
a communication device adapted to provide local processing and to transmit and receive information over a radio frequency communication link, wherein said communication device comprises:
a power source;
a computing unit coupled to the power source, said computing unit providing the local processing and comprising a processor, a memory, and a user interface; and
a radio frequency (RF) unit selectively coupled to the power source through a switch to enable said wireless communication, the RF unit having a radio transceiver, a signal processing unit, and an antenna,
wherein the switch is adapted to selectively enable the RF unit to provide, respectively, a wireless communication enabled mode having both the wireless communication and the local processing accessible, and a wireless communication disabled mode having the local processing accessible and the wireless communication inaccessible; and
wherein the communication device is configured to send a notification signal to one or more base stations indicating that the communication device is switching to the wireless communication disabled mode.

30. The system of claim 29, when said RF unit comprises an antenna, and wherein the switch is operable to selectively increase/decrease the shielding of the antenna.

31. The system of claim 29, wherein a first power source is coupled to the computing unit and a second power source is coupled to the RF unit and the switch is operable to selectively connect/disconnect the RF unit from the second power source.

32. A method comprising:
transmitting voice communications from a portable communication device over a radio frequency communication link, said portable communication device having interactive data processing functionality powered by a first power supply and a wireless signal communication functionality powered by a second power supply;
simultaneously enabling access to the interactive data processing functionality and the wireless signal communication functionality; and
in response to detecting an event, disconnecting the second power supply and disabling the wireless signal communication functionality while simultaneously maintaining the access to the interactive data processing functionality by use of a selection mechanism.

33. The method of claim 32, wherein disabling said wireless signal communication functionality comprises disabling a wireless signal reception functionality.

34. The method of claim 32, wherein disabling said wireless signal communication functionality comprises disabling a functionality to place calls to a public switched telephone network (PSTN).

35. A method comprising:
transmitting voice communications from a portable communication device over a radio frequency communication link, said portable communication device having a computing functionality powered by a first power supply and a wireless communication functionality powered by a second power supply;
providing a first mode of said portable communication device having both the wireless communication functionality and the computing functionality operational;
providing a second mode of said communication device having the computing functionality operational and disconnecting the second power supply making the wireless communication functionality non-operational; and
automatically switching between the first mode and the second mode in response to a trigger signal received at the communication device.

36. The method of claim 35, wherein the portable communication device comprises a cell phone with personal digital assistant functionality.

37. The method of claim 35, wherein the portable communication device comprises a personal digital assistant (PDA) with a wireless communication unit.

38. The method of claim 35, and further comprising generating said trigger signal in response to pressure on a button on the device.

39. The method of claim 35, and further comprising transmitting said trigger signal from a base station.

* * * * *

UNITED STATES PATENT AND TRADEMARK OFFICE
CERTIFICATE OF CORRECTION

PATENT NO. : 7,647,070 B2
APPLICATION NO. : 11/496021
DATED : January 12, 2010
INVENTOR(S) : Nitin J. Shah It is certified that error appears in the above-identified patent and that said Letters Patent is hereby corrected as shown below:

Column 6, line 54 (Claim 1): Delete "comprising;" and replace with --comprising:--;

Column 6, line 56 (Claim 1): Delete "link;" and replace with --link,--;

Column 7, line 24 (Claim 6): After "of the" insert --portable--;

Column 8, line 2 (Claim 11): Delete "functionality" and replace with --functionality,--;

Column 8, line 19 (Claim 13): Delete "to a" and replace with --to the second--;

Column 8, line 25 (Claim 14): After "whether" insert --the--;

Column 8, line 66 (Claim 21): After "transmitting" insert --said--;

Column 9, line 11 (Claim 25): After "transmitting" insert --said--;

Column 9, line 15 (Claim 26): After "transmitting" insert --said--;

Column 9, line 51 (Claim 30): Delete "when" and replace with --wherein--; and

Column 10, line 1 (Claim 31): Delete "RE" and replace with --RF--.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,647,070 B2
APPLICATION NO. : 11/496021
DATED : January 12, 2010
INVENTOR(S) : Nitin J. Shah It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 191 days.

Signed and Sealed this

Sixteenth Day of November, 2010

David J. Kappos
*Director of the United States Patent and Trademark Office*